United States Patent
Meeuws et al.

(10) Patent No.: US 11,612,113 B2
(45) Date of Patent: Mar. 28, 2023

(54) METHOD AND DEVICE FOR CULTIVATION OF CROPS

(71) Applicant: Blue Skies 1989 B.V., Sterksel (NL)

(72) Inventors: Gerardus Johannes Jozef Maria Meeuws, Sterksel (NL); Cornelia Henrica Petronella Maria Meeuws-Aben, Sterksel (NL); Marc Kreuger, Grootebroek (NL)

(73) Assignee: BLUE SKIES 1989 B.V., Sterksel (NL)

( * ) Notice: Subject to any disclaimer, the term of this patent is extended or adjusted under 35 U.S.C. 154(b) by 0 days.

(21) Appl. No.: 16/973,955

(22) PCT Filed: Jun. 11, 2019

(86) PCT No.: PCT/NL2019/050350
§ 371 (c)(1),
(2) Date: Dec. 10, 2020

(87) PCT Pub. No.: WO2019/240572
PCT Pub. Date: Dec. 19, 2019

(65) Prior Publication Data
US 2021/0235636 A1     Aug. 5, 2021

(30) Foreign Application Priority Data
Jun. 11, 2018     (NL) ..................................... 2021101

(51) Int. Cl.
*A01G 9/24* (2006.01)
*F21V 29/58* (2015.01)
*F21V 29/61* (2015.01)
*A01G 7/04* (2006.01)

(52) U.S. Cl.
CPC ............. *A01G 9/249* (2019.05); *A01G 7/045* (2013.01); *A01G 9/246* (2013.01); *F21V 29/59* (2015.01); *F21V 29/61* (2015.01)

(58) Field of Classification Search
CPC ........ A01G 9/246; A01G 9/249; A01G 7/045; F21V 29/59
See application file for complete search history.

(56) References Cited

FOREIGN PATENT DOCUMENTS

| CA | 3051838 A1 * | 8/2018 | ............. A01G 7/045 |
|----|--------------|--------|------|
| DE | 102016222326 B3 | 1/2018 | |
| GB | 1307763 | 2/1973 | |
| WO | WO-2012060282 A1 | 5/2012 | |
| WO | WO-2018062988 A2 | 4/2018 | |

OTHER PUBLICATIONS

DE102016222326B3 translation (Year: 2018).*

* cited by examiner

*Primary Examiner* — Monica L Perry
(74) *Attorney, Agent, or Firm* — Perry + Currier Inc.

(57) ABSTRACT

In a device a crop is cultivated in an at least substantially daylight-free environment, wherein the crop is exposed in an at least substantially fully conditioned cultivation space (10) to actinic artificial light from an array of artificial light sources (30) present in the cultivation space. During a cultivation cycle a power output of the artificial light sources (30) is adapted to an energy absorption of a part of the crop (50) illuminated thereby such that the crop close to each of the array of artificial light sources is subject to an at least substantially constant and at least substantially mutually equal vapour deficit.

16 Claims, 2 Drawing Sheets

METHOD AND DEVICE FOR CULTIVATION OF CROPS

The present invention relates to a method for cultivating a crop, in particular in an at least substantially daylight-free environment, wherein the crop is exposed in an at least substantially fully conditioned cultivation space to actinic artificial light particularly comprising photosynthetically active radiation (PAR) from an array of artificial light sources present in the cultivation space.

The invention also relates to a device for producing crops, in particular in an at least substantially daylight-free environment, comprising an at least substantially fully conditioned cultivation space between an air inlet and an air outlet for an at least substantially laminar airflow, comprising an air treatment installation for maintaining and, if desired, treating said laminar airflow, comprising an array of light fittings present in the cultivation space with one or more artificial light sources which are able and configured to generate actinic artificial light, particularly comprising photosynthetically active radiation (PAR), and to expose the crop thereto.

Such a method and device are known for instance from American patent U.S. Pat. No. 9,357,718. Described therein is a cultivation environment wherein the crop is subjected in a conditioned environment to a largely controlled cultivation climate. In addition to an air condition, this climate also comprises exposure to an adapted light spectrum with photoactive (PAR) radiation.

The light fittings frequently applied at the present time make use of LED lighting to provide the light spectrum. Although the lighting efficiency hereof is many times greater than that of more conventional and traditional gas discharge lamps, such LED fittings still produce a considerable amount of heat in addition to photoactive (PAR) radiation. This heat is partially entrained by an airflow guided through the cultivation space, which does not alter the fact that the space temperature will inevitably increase more or less gradually downstream. The relative air humidity hereby falls and the crop will be able to evaporate more. While this increased space temperature does result in a more rapid crop development (growth) locally, this is in itself undesirable because a content of solid constituent substances hereby falls below a desired level, and uniformity over the whole cultivation area cannot be guaranteed when the cultivation area is scaled up excessively.

In addition, the photosynthesis of crops in conventional daylight-free cultivation also imposes limits on the maximum efficiency of a cultivation space or cell. This is because, as well as being dependent on supplied PAR light, photosynthesis also depends on the absorption of carbon dioxide by the crop. There are however limits to the enrichment of the ambient air with carbon dioxide, these being at a level in the order of 1500-2000 ppm. Beyond this level the crop development is adversely affected by the high carbon dioxide concentration. An increased supply of carbon dioxide to the crop desirable for enhancing the photosynthesis therefore requires an airflow over the crop which always has a fresh supply of carbon dioxide below this maximum limit.

For the absorption of carbon dioxide the stomata in the leaf must however open, which will also result in more evaporation and thereby in loss of moisture (dehydration). This effect becomes stronger as the air velocity over the crop increases. Ultimately the crop can hereby "burn", which of course has to be avoided. A conventional cultivation environment hereby imposes significant limits on the maximum air velocity over the crop, and thereby on the maximum scale size to which initiatives hitherto undertaken for daylight-free, fully conditioned cultivation of crops can be realized in practice.

In the case the airflow is recirculated a substantial dehumidifying installation is moreover frequently applied in known indoor farming projects to extract an excess of water vapour from the air before the air is guided back into the cultivation space. This requires a considerable amount of extra energy, which in turn largely or even wholly offsets the value of a possible increased production output of the cultivation environment.

The present invention has for its object, among others, to provide a method and device for conditioned cultivation of crops which obviates to at least significant extent these and other limits to a further scaling-up of the process.

In order to achieve the stated object a method of the type described in the preamble has the feature according to the invention that during a cultivation cycle a power output of the artificial light sources is adapted to an energy absorption of a part of the crop illuminated thereby such that the crop close to each of the array of artificial light sources is subject to an at least substantially constant vapour deficit. The aim here within the context of the invention is a vapour deficit which is kept constant within 5%, and preferably within 2.5%, of an average value (expressed in g/kg) over the whole cultivation environment.

A device of the type described in the preamble has the feature that the fittings are provided with controllable cooling means with which a power output of the artificial light sources is adaptable during a cultivation cycle to an energy absorption of a part of the crop illuminated thereby such that the crop close to each of the array of fittings is subject to an at least substantially constant and at least substantially mutually equal vapour deficit. In this context the vapour deficit is deemed at least substantially constant and at least substantially mutually equal when it varies by less than 5%, and preferably by less than 2.5%, from an average value (expressed in g/kg) in the whole cultivation environment.

Said damp deficit is understood in this context to mean a difference between the actual partial vapour pressure of water vapour in the atmosphere and the maximum partial vapour pressure at the prevailing space temperature, i.e. the difference between the actual water vapour content in the air and the maximum water vapour content in the air at saturation (expressed in g/kg). This is a measure for the quantity of water (vapour) which the ambient air can still absorb at the prevailing temperature. This is essentially the moisture deficit to which the crop is subject at the prevailing temperature. It is noted here that the vapour deficit controlled with the present invention should not be confused with the relative air humidity, which is defined as the percentage of the actual moisture content of the air relative to a maximum moisture content at a prevailing ambient temperature. Although according to the invention the vapour deficit in the space is everywhere held substantially constant, the same need not apply in the least for the air humidity in the space.

The extent of exchange of oxygen, carbon dioxide and water vapour between the substomatal cavity and the atmosphere is naturally regulated with the position of the stomata (pores) in the leaf of a plant. When the atmosphere can absorb a great deal of water vapour, the stomata will partially or wholly close in order to prevent dehydration or even burning as well as possible. The 'suction capability' of the atmosphere is determined by a combination of the flow velocity of the air and the vapour deficit. According to the invention this, as it were, suction action exerted on the crop by the atmosphere is held constant within acceptable limits in the whole cultivation space, or a part thereof intended for the purpose. This imparts a significant further control over the crop development which, among other factors, makes possible a considerable increase in the maximum scale size of the cultivation space.

The invention is based here on the insight that a further scaling-up of a method and cultivation environment of the type described in the preamble is not only limited by a gradual temperature increase but at least as much by the evaporation from the crop. The photomorphogenic balance of the crop is ultimately limited by the extent of carbon dioxide absorption and by the evaporation associated with a greater or lesser opening of the stomata. As a result either the photosynthesis of the crop can ultimately no longer keep up with the growth speed, which leads to undesirable loss of quality, or there is such a high moisture loss through evaporation that the crop dehydrates and, in the extreme case, even burns.

However, because according to the invention the vapour deficit in the cultivation space is kept under control, the evaporation in the crop is everywhere controlled to large and, it has been found, sufficient extent so that a higher photosynthesis level can be reached without damage as a result of dehydration. The result is a greater possibility, only limited by technical factors, of further dimensioning and scaling-up of the cultivation environment, whereby necessary investment in equipment and construction work can be offset against a greater yield, which has the result of a considerable increase in the economic efficiency of this form of horticulture, also referred to as indoor farming.

Due to an unavoidable heat generation from traditional, but also LED-based light fittings, conventional indoor farming projects as described in the preamble require cooling installations with a high cooling capacity in order to hold the spatial temperature in the cultivation space within acceptable limits. For this purpose an airflow is usually guided through the cultivation space and over the light fittings and made capable of absorbing heat from the fittings and discharging it outside the cultivation space. There the air is carried through a heat exchanger, usually referred to as a cold battery, which lowers the air temperature to a desired level.

A drawback of such a method is however that in practice, with the available space in mind, cold batteries are usually applied for this purpose which not only result, on a heat-exchanging surface with the flow-by air, in a fall in temperature of the air but also in dehumidification through condensation. This latter is however not always desirable in practice because such a strong dehumidification results in a high vapour deficit, whereby the stomata will close and the absorption of carbon dioxide, and thereby the level of photosynthesis, will fall. Through excessive dehumidification valuable water is moreover lost if it cannot be reused, while this requires a relatively large amount of cooling energy and energy is moreover necessary in order to rehumidify the air before returning the airflow to the cultivation space.

A preferred embodiment of the method according to the invention therefore has the feature that an atmosphere of the cultivation space is subjected to an air treatment wherein a temperature of the atmosphere is maintained above a dew point thereof. Undesirable moisture loss is thus prevented as a result of the cooling, whereby rehumidification of the air will not be required, or at least to considerably lesser extent, in order to maintain the intended uniform vapour deficit in the cultivation space. A particular embodiment of the device according to the invention has the feature that the air treatment installation comprises a cooling device, in particular a cold battery, which is provided with a condensation collector. When in that case moisture is nevertheless still extracted from the circulating air, the condensed moisture can thus be reused and it is possible to avoid it being lost. Too high a air humidity can hereby be reduced to a desired level by means of forced condensation.

Because the crop will be able to evaporate to increasing extent during the development of the leaf system, the moisture content in the atmosphere will usually increase as the crop develops more leaf. Necessary at the same time for the physical process of evaporation is heat which will be extracted from the environment by the crop. Both effects together result in an increase in the local air humidity, and so a decrease in the damp deficit in the crop.

In order to nevertheless maintain the vapour deficit at the desired constant and at least substantially mutually equal level, a further preferred embodiment of the method according to the invention has the feature that a power output of the at least one artificial light source is adapted to an evaporation and an energy absorption of a part of the crop illuminated thereby. When the crop has less leaf, and thereby less assimilating and evaporating surface area, the power output of the artificial light source will for instance be reduced so as to not allow the ambient temperature to rise unacceptably, while in the case of a more voluminous leaf system and likewise assimilating and evaporating surface area of the crop the evaporating energy extracted thereby from the environment can be supplemented from the artificial light source. All in all, the net thermodynamic heat balance of lighting and leaf evaporation can thus be adapted such that the vapour deficit is maintained at a desired level.

With this in mind a further preferred embodiment of the method according to the invention has the feature that the at least one artificial light source is provided with a controllable cooling, a cooling capacity of which is adapted to a resultant of the power output of the artificial light source and the energy absorption of the crop. Such a cooling here provides the option of precisely adapting the final heat dissipation of the artificial light source to the environment to the heat and water vapour balance of the crop residing thereunder, this during the whole cultivation cycle from germination or cutting to harvest.

A further preferred embodiment of the method according to the invention has in this respect the feature that the fittings are cooled in controlled manner in the flow direction of the at least substantially laminar airflow in order to impose thereunder, from fitting to fitting, an increasing ambient temperature and to maintain an associated temperature gradient in the cultivation space. While the actual content of water vapour in the air will increase downstream as a result of evaporation, at the imposed higher temperature the maximum content of water vapour in the air will increase proportionally, whereby the vapour deficit nevertheless remains substantially constant in a path from an air inlet into the cultivation space to an air outlet out of the cultivation space.

A particular embodiment of the method and a particular embodiment of the device according to the invention each have the feature here that the controllable cooling comprises a liquid cooling, which liquid cooling is realized by a forced circulation of a liquid cooling medium in heat-exchanging contact with the artificial light sources. A further embodiment of the device according to the invention has for this purpose the feature that the cooling means comprise a controlled circulation of a cooling medium, which cooling medium can, at least during operation, enter into heat-exchanging contact with the at least one light source in the fitting. A preferred embodiment of the device according to the invention has the feature here that the fitting is provided, in optionally groupwise manner with a number of adjacent fittings, with an individually controllable cooling and controller adapted thereto.

Such an active liquid cooling can be very powerful, whereby a final heat generation from the fittings is limited to an acceptable and even desired level. A possible cooling capacity outside the cultivation space, necessary to restore a circulating airflow to input conditions, can thus remain limited. This has the important advantage that, inside an air treatment installation intended and configured herefor, a temperature of all contact surfaces which interact with the air need in many cases nowhere fall below the dew point of the air, whereby undesirable dehumidification of the air as a result of condensation can be prevented. The cooling medium applied for the forced liquid cooling enters into direct thermodynamic contact with the relatively warm fitting, whereby an exceptionally efficient and effective heat discharge exits therefrom.

With the efficiency of the installation in mind, both in terms of cost and occupied space, a further particular embodiment of the method and device according to the invention has the feature that the light sources, optionally in groupwise and/or collective manner, are accommodated in fittings, wherein the fittings are each provided in optionally groupwise manner with a liquid cooling, and that the cooling medium is brought into individual heat-exchanging contact with each of the fittings. A collective housing of the light sources as well as cooling conduits for carrying liquid for the purpose of the liquid cooling thereof can thus be shared by a group of light sources. A further embodiment of the device according to the invention has in this respect the feature that the fitting is provided, in groupwise manner with a number of adjacent fittings, with a controllable cooling and a controller adapted thereto, wherein the adjacent fittings are placed in a direction transversely of a flow direction of the laminar airflow.

A further particular embodiment of the method according to the invention has the feature that the controllable cooling comprises an air cooling, which air cooling is realized by a common, at least substantially laminar airflow in heat-exchanging contact with the artificial light source. In addition to or instead of a liquid cooling with a circulating liquid cooling medium, this embodiment provides for an air cooling by means of a laminar airflow, in particular the same laminar airflow which is also guided over the crop. In addition to providing an additional cooling, this also provides a heat-exchanging contact with this airflow so as to thus keep the vapour deficit therein constant.

With a practical implementation in mind, a further preferred embodiment of the method according to the invention has the feature that the light sources, optionally in groupwise and/or collective manner, are accommodated in fittings, and that the at least substantially laminar airflow is guided over and along the fittings, wherein in a further embodiment the method is characterized in that the fittings are cooled in controlled manner in the flow direction of the at least substantially laminar airflow in order to maintain thereunder, from fitting to fitting, an at least substantially constant vapour deficit. There is therefore complete control of the heat exchange between the fittings and the surrounding area.

With a view to a sufficient cooling capacity, a further embodiment of the method has the feature here that the controlled cooling of the fittings comprises an air cooling along the fitting as well as a liquid cooling with a forced circulation of a liquid cooling medium in at least substantially direct thermodynamic contact with the fitting, wherein the circulation of the liquid cooling medium is controlled in heat-exchanging contact with the fitting in order to maintain, from fitting to fitting, an at least substantially constant vapour deficit under the fitting.

It is otherwise noted that, as well as by an optionally mixed cooling of the fittings, a heat generation thereof can also be regulated and adapted by operating the light sources at a lower or higher power. Use is thus advantageously made within the scope of the invention of light sources which are dimmable in individual or groupwise manner so that a power supply and consumption thereof is adjustable. Particularly in the initial phase of the crop development the light sources can thus be operated at a relatively low power so as to nevertheless supply sufficient PAR radiation to guarantee an optimum photosynthesis.

For a healthy and optimal crop development a further particular embodiment of the method according to the invention has the feature that the vapour deficit is set and maintained at a level of between about 0.5 and 6 grams of water per kilogram of air. It has been found that such a vapour deficit in the immediate vicinity of the crop provides the possibility of a high speed of development of the crop as well as the creation of dry matter as a result of photosynthesis. A hitherto unrivalled yield and quality are hereby possible.

A contribution is made toward this by allowing the airflow along and through the crop the freedom to increase without the vapour deficit being adversely affected as a result. A further preferred embodiment of the method according to the invention has in this respect the feature that the laminar airflow is guided with a flow velocity of between 15 and 100 cm/s over and/or through the crop. A particular embodiment of the device according to the invention has for this purpose the feature that the air treatment installation is able and configured to sustain a laminar airflow in the cultivation space with an air velocity of between 15 and 100 cm/s during operation.

For a good exchange of carbon dioxide and oxygen the stomata have to be opened in combination with a sufficiently high content of carbon dioxide (for instance in the order of 1500-2000 ppm) and an airflow with a velocity of about 15 to 100 cm/s. In order to prevent (partial) closure of the stomata so as to prevent loss of moisture at such a flow velocity of the air, the vapour deficit must be sufficiently low. Other than in a conventional cultivation environment, it is possible according to the present invention to precisely control, and particularly maintain the vapour deficit at between about 0.5 and 6.0 g/kg even at such a high air velocity. A higher air velocity also has the advantage that both the difference in temperature and the difference in vapour deficit decrease between air inlet and air outlet, whereby the maximum scale size of an indoor farm increases, and thereby the economic feasibility.

Such a forced airflow not only provides for cooling as a result of evaporation of water by the crop, but also for a supply of fresh recirculation air having therein an optionally replenished amount of carbon dioxide essential in the context of the photosynthesis of the crop. This carbon dioxide exchange can be raised to a higher level because of the invention, whereby the production can be increased and/or the cultivation cycle shortened. This contributes further toward the economic efficiency and the economic feasibility of a method of the type described in the preamble, often referred to as indoor farming.

The invention will be further elucidated hereinbelow on the basis of an exemplary embodiment and an accompanying drawing. In the drawing.

It is noted that the figure is purely schematic and not drawn to scale. Some dimensions and components in particular may be exaggerated to greater or lesser extent for the sake of clarity. Corresponding parts are generally designated with the same reference numeral.

Figure 1:
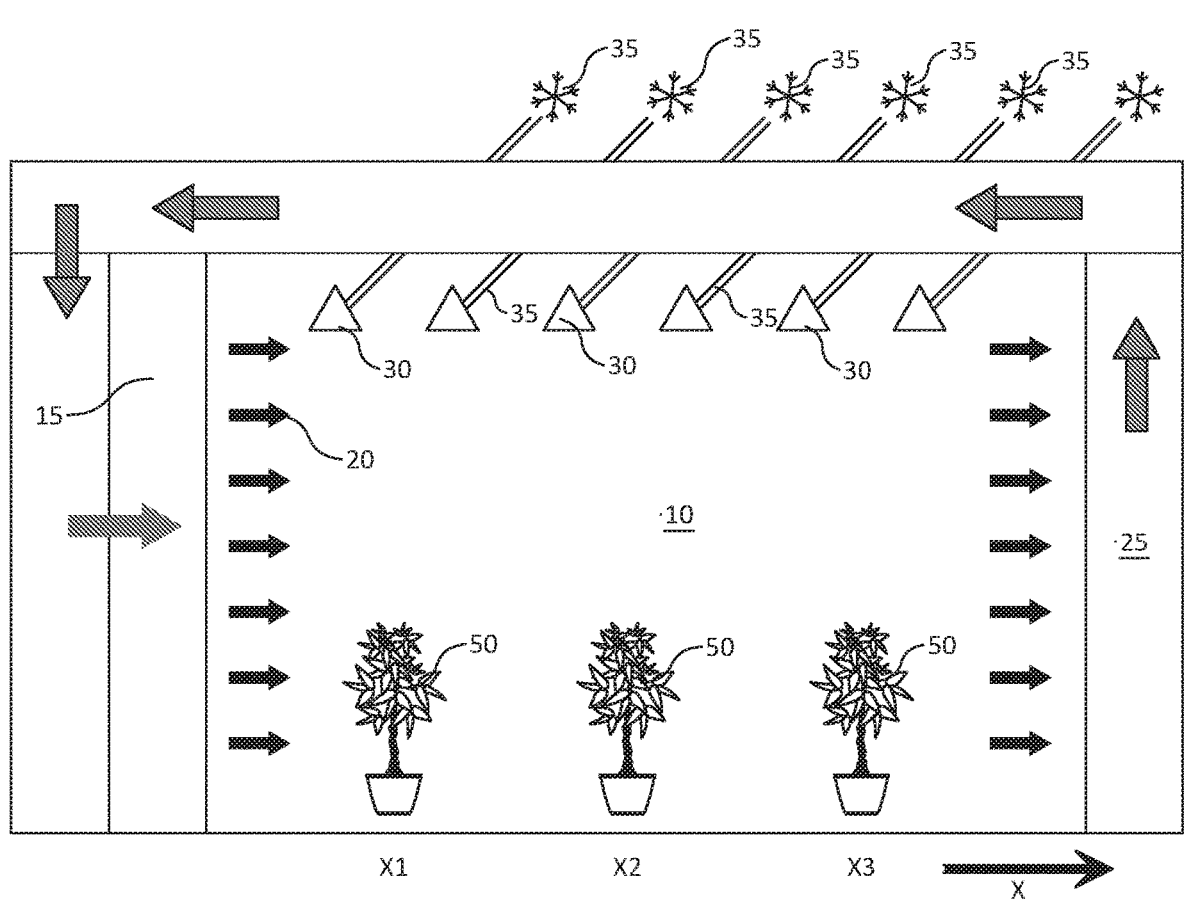
FIG. 1 shows a schematic side view of the setup and construction of an exemplary embodiment of a device according to invention.

Shown schematically in FIG. 1 is a construction of a cultivation device for daylight-free crop production, also referred to as indoor farming. This involves an at least substantially fully conditioned cultivation space 10, usually also referred to as climate chamber or climate cell, in which a spatial climate is precisely monitored and can if desired be held constant within certain limits. Climate parameters which are a factor here, in addition to a space temperature, are a carbon dioxide concentration and a spatial air humidity. These parameters are recorded at one or more measuring points with sensors provided for the purpose, but can if desired differ from place to place in the cultivation space.

This latter is first and foremost a result of a forced airflow 20 guided through the cultivation space. After optionally having been treated outside space 10, this airflow is admitted via an inlet plenum 15 and continues on its way through cultivation space 10 as an at least substantially wholly laminar airflow, and leaves the cultivation space via a return plenum 25. Said air treatment normally comprises of cooling and humidifying or dehumidifying the air to a desired relative air humidity.

Present in cultivation space 10 is an array of artificial light sources 30 in the form of an array of LED fittings. These emit photosynthetically active radiation (PAR) which is essential for the photosynthesis, and thereby development, of crop 50 but which also dissipate heat into the space. A part thereof will be exchanged with airflow 20, but this will also result little by little in a gradual local increase in temperature in cultivation space 10. This temperature increase is always a local net balance of the heat emitted by lighting 30 and the energy absorbed by the crop for the purpose of evaporation via the leaf, growth and photosynthesis and the heat discharged by the liquid cooling of the fittings.

Figure 2:
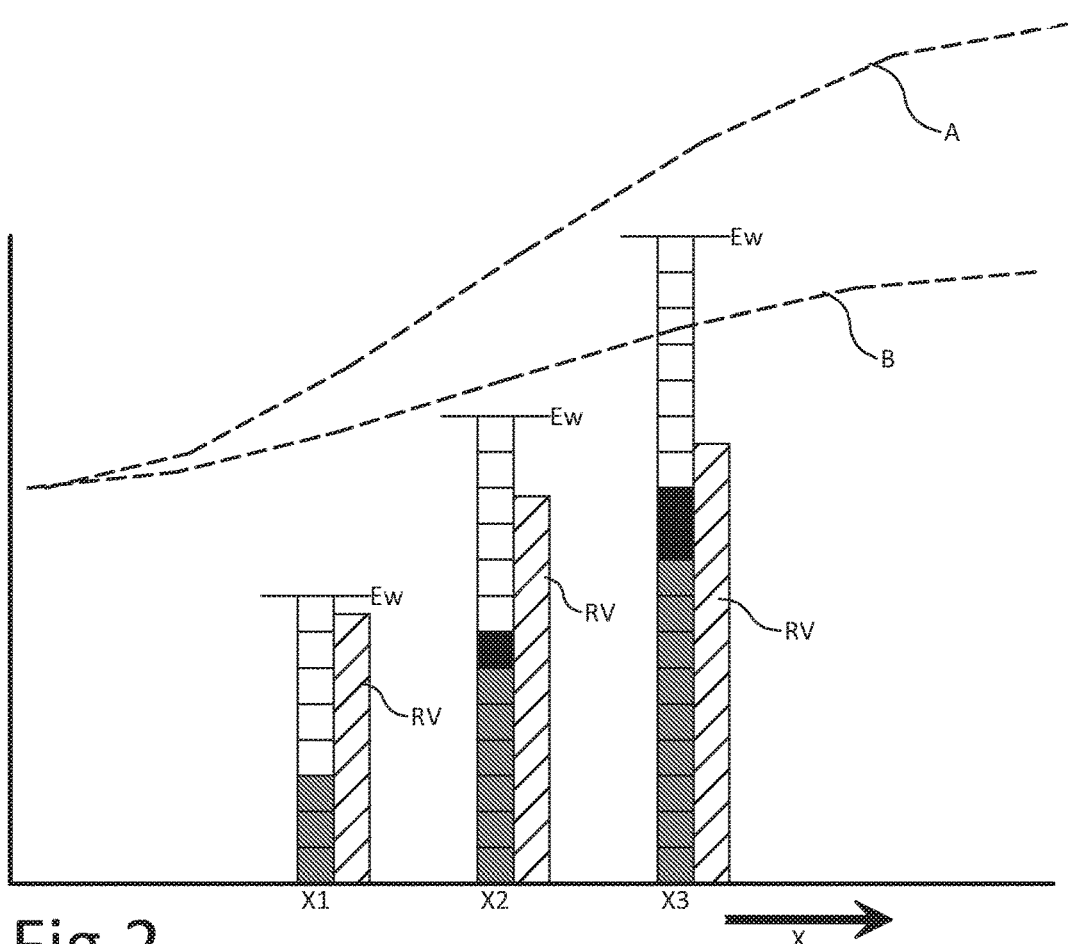
FIG. 2 shows schematically and solely by way of illustration the temperature and moisture variation downstream in the laminar air flow in a conventional cultivation device.

The temperature variation is shown schematically in FIG. 2 in the form of a curve A. In the course of the development of the crop, and thereby the development of the leaf system, the evaporation component will increase (strongly), whereby curve A will rise less steeply. The amount of water vapour (moisture) released by the leaf of crop 50 is shown in simplified manner in FIG. 2 in the form of a block diagram. The filled blocks indicate here the release of moisture from the crop at the position of successive parts X1, X2, X3 of crop 50 in the flow direction of airflow 20 below respective fittings 30, as shown in FIG. 1. The empty blocks indicate schematically a local vapour deficit. This is the difference between the actual fraction of water vapour in the air and the level of saturation Ew at the given temperature, i.e. at a relative air humidity of 100%.

It will be apparent from FIG. 2 that the power output by the fittings in a conventional cultivation space results in a strong increase in the temperature, whereby the saturation level Ew, and thereby the vapour pressure deficiency affecting the crop, rises. A stronger evaporation is the result hereof, this being symbolized in the figure by the blocks with dark hatching. The value of the relative air humidity RV is also shown schematically at each position by way of illustration in the form of a bar diagram.

According to the invention however, the vapour pressure deficiency below fittings 30 is controlled and kept constant and at least substantially mutually equal within narrow limits. Fittings 30 are provided for this purpose with controllable active cooling means 35. In this example this entails a forced cooling by means of a regulated circulation with a suitable cooling medium, such as water, which is brought into substantially direct heat-exchanging contact with fitting 30 via a conduit system by the metal conduits of the conduit system making physical contact with the metal of the metal housing of fitting 30. The light sources are moreover dimmable, whereby the PAR light emission can be optimally adapted to the actual state of development of the part of the crop thereunder. By dimming the PAR emission the light sources will likewise generate less power output (heat), so that in some conditions less or no forced liquid cooling at all is necessary.

Overall during the whole cultivation cycle (i.e. from germination, seedling or cutting to harvesting) a power output of the artificial light sources is continuously adjustable to an energy absorption of a part of the crop thereunder such that the crop is subject to an at least substantially constant and at least substantially mutually equal vapour deficit below each of the array of fittings. This means in practice that the temperature in the cultivation space rises less quickly as a result of the liquid cooling of the fittings, this being indicated in FIG. 2 with the curve B.

Figure 3:
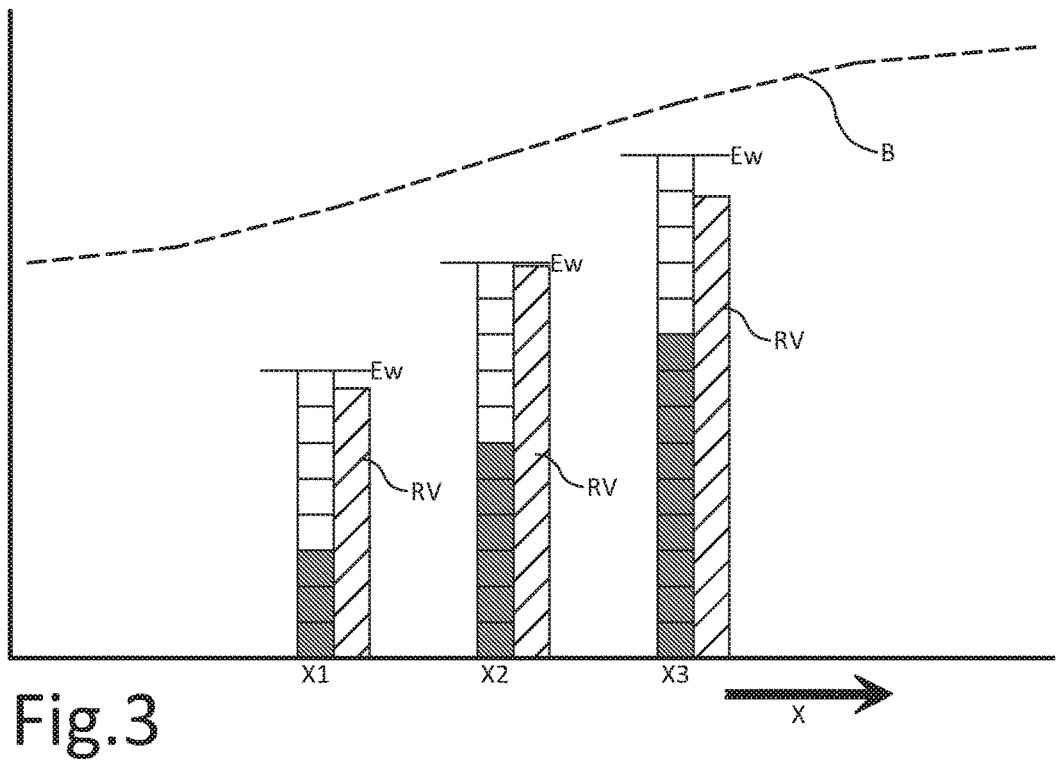
FIG. 3 shows schematically and solely by way of illustration the temperature and moisture variation downstream in the laminar air flow in the cultivation device of FIG. 1.

More specifically by realizing, imposing and maintaining a specific temperature gradient in the cultivation space the vapour deficit can be precisely controlled in the X-direction and can be kept constant and at least substantially mutually equal from place to place (optionally in a specific area) as shown in FIG. 3. The value of the relative air humidity RV at each position is also shown schematically by way of illustration here in the form of a bar diagram. The value hereof is calculated from the quotient of the actual moisture content of the air per position relative to the maximum moisture content Ew at the location. It will be immediately apparent herefrom that, although according to the invention the vapour deficit is everywhere held at least substantially equal, the same need not in the least apply for the relative air humidity, and is therefore not in fact the case in the figure. On the contrary, the relative air humidity RV gradually increases.

Due to a constant laminar airflow (velocity) in combination with a substantially constant vapour deficit in the air the crop will be subject everywhere in the cultivation space to a substantially constant water vapour balance and will adapt its own evaporation thereto so that it will likewise be the same everywhere in the cultivation space. If desired, the cooling of the fittings in a direction transversely of the flow direction X of airflow 20 can be carried out collectively for all fittings or groupwise for some of them, this providing advantages from an installation engineering viewpoint.

An additional advantage of the hybrid cooling of the fittings, i.e. a cooling not only by airflow 20 but also by the forced cooling 35, is a smaller increase in the air humidity and air temperature of the exiting airflow. The air treatment outside the cultivation space can hereby remain limited. A cooling installation is advantageously applied herefor with a cooling surface, a temperature of which remains if desired above a dew point of the air so that undesirable dehumidification as a result of condensation can be prevented.

The control according to the invention of both the temperature (increase) and the vapour deficit in the cultivation environment allows cooling outside the cultivation environment with a relatively small temperature difference, in particular with a cooling surface above the dew point. A greater part of the heat produced by the light sources can be directly dissipated by means of the forced liquid cooling and need therefore not be removed by the air treatment installation. A relatively large temperature difference between cooling medium and fitting here allows an exceptionally efficient and effective heat transfer. However, by bringing the cooling installation of the air treatment below the dew point an excess of water vapour can nevertheless be captured by condensation if desired. Water vapour is in that case extracted from the air by condensation before the air is returned at a desired initial temperature to the cultivation environment. The condensate is in that case advantageously collected and if desired fed back or otherwise (re)used in useful manner.

Because the vapour deficit in the cultivation space is managed according to the invention and everywhere kept at least substantially the same, the invention allows a higher airflow velocity in the cultivation space without causing an unacceptably great evaporation of the crop which could otherwise adversely affect crop development. In the shown device an airflow is particularly guided through the cultivation space at a velocity of between 15 and 100 cm/s, whereby exchange of carbon dioxide with the crop is considerably greater than in a conventional cultivation space in which a maximum airflow velocity is limited to a lower level. The consequence hereof is a higher level of photosynthesis, with a stronger and more rapid crop development as result. Harvesting can hereby take place sooner with the same proportion of dry matter and other useful components and constituent substances in the crop. It will be apparent that this will enhance the economic efficiency of the cultivation environment.

Although the invention has been further elucidated above on the basis of only a single exemplary embodiment, it will be apparent that the invention is by no means limited thereto. On the contrary, many variations and embodiments are still possible within the scope of the invention for a person with ordinary skill in the art. As well as being applied in a wholly or substantially wholly daylight-free environment, the invention can in particular also be applied, while retaining the above described advantages, when the crop is exposed to sunlight, such as in cultivation under glass.

The invention claimed is:

1. Method for cultivating a crop, in particular in an at least substantially daylight-free environment, said environment comprising an at least substantially fully conditioned cultivation space, an air inlet and an air outlet for directing an at least substantially laminar airflow through said cultivation space, and comprising an array of an array of artificial light sources in a direction between said air inlet and said air outlet, wherein the crop is exposed in said at least substantially fully conditioned cultivation space to actinic artificial light, particularly comprising photosynthetically active radiation (PAR), emitted by an artificial light source from said array of artificial light sources present in the cultivation space, an at least substantially laminar air flow is directed through said cultivation space in said direction from said air inlet to said air outlet, in that during a cultivation cycle a power output of the artificial light sources is adapted to an energy absorption of a part of the crop illuminated thereby such that the crop is subject to a mutually at least substantially equal vapour deficit near to each artificial light source of said array of artificial light sources,
wherein said at least one artificial light source is accommodated in a fitting provided with a controllable cooling, a cooling capacity of which is adapted to a resultant of the power output of the artificial light source and the energy absorption of the crop, wherein the controlled cooling of the fitting comprises an air cooling along the fitting as well as a liquid cooling with a forced circulation of a liquid cooling medium in at least substantially direct thermodynamic contact with the fitting, and wherein the circulation of the liquid cooling medium is controlled in heat-exchanging contact with the fitting in order to maintain said at least substantially equal vapour deficit under the fitting.

2. Method as claimed in claim 1, characterized in that an atmosphere of the cultivation space is subjected to an air treatment wherein a temperature of the air is maintained above a dew point thereof.

3. Method as claimed in claim 1, characterized in that a power output of the at least one artificial light source is adapted to an evaporation and an energy absorption of a part of the crop located thereunder.

4. Method as claimed in claim 1, characterized in that the controllable cooling comprises a liquid cooling, which liquid cooling is realized by a forced circulation of a cooling medium in heat-exchanging contact with the artificial light sources.

5. Method as claimed in claim 4, characterized in that the light sources, optionally in groupwise and/or collective manner, are accommodated in fittings, wherein the fittings are provided in optionally groupwise manner with a liquid cooling, the cooling medium of which is brought into heat-exchanging contact with each of the fittings.

6. Method as claimed claim 1, characterized in that said air cooling is realized by a common, at least substantially laminar airflow in heat-exchanging contact with the artificial light source.

7. Method as claimed in claim 6, characterized in that the light sources, optionally in groupwise and/or collective manner, are accommodated in fittings, and that the at least substantially laminar airflow is guided over and along the fittings.

8. Method as claimed in claim 7, characterized in that the laminar airflow is guided with a flow velocity of between 15 and 100 cm/s over the crop.

9. Method as claimed claim 7, characterized in that the fittings are cooled in controlled manner in the flow direction of the at least substantially laminar airflow in order to impose thereunder, from fitting to fitting, an increasing ambient temperature and to maintain an associated temperature gradient in the cultivation space.

10. Method as claimed in claim 6, characterized in that in a flow direction of the at least substantially laminar airflow in order to maintain thereunder, from fitting to fitting, an at least substantially constant vapour deficit.

11. Method as claimed in claim 1, characterized in that the vapour deficit is set and maintained at a level of between about 0.5 and 6 grams of water per kilogram of air.

12. Device for producing crops, in particular in an at least substantially daylight-free environment, comprising an at least substantially fully conditioned cultivation space between an air inlet and an air outlet for an at least substantially laminar airflow, comprising an air treatment installation for maintaining and, if desired, treating said laminar airflow, comprising an array of light fittings in a direction between said air inlet and said air outlet, wherein said light fittings are present in the cultivation space and comprise one or more artificial light sources which are able and configured to generate actinic artificial light particularly comprising photosynthetically active radiation (PAR), and to expose the crop thereto, characterized in that each of the fittings is provided with controllable cooling means with which a power output of the artificial light sources is adaptable during a cultivation cycle to an energy absorption of a part of the crop illuminated thereby such that the crop close to each of the array of fittings is subject to an at least substantially equal vapour deficit, wherein the controlled cooling of the fittings comprises an air cooling along the fitting as well as a liquid cooling with a forced circulation of a liquid cooling medium in at least substantially direct thermodynamic contact with the fitting, wherein the circulation of the liquid cooling medium is controlled in heat-exchanging contact with the fitting in order to maintain, from fitting to fitting, said at least substantially equal vapour deficit under the fitting.

13. Device as claimed in claim 12, characterized in that the fitting is provided, in optionally groupwise manner with a number of adjacent fittings, with an individually controllable cooling and controller adapted thereto.

14. Device as claimed in claim 13, characterized in that the fitting is provided, in groupwise manner with a number of adjacent fittings, with a controllable cooling and a controller adapted thereto, wherein the adjacent fittings are placed in a direction transversely of a flow direction of the laminar airflow.

15. Device as claimed in claim 12, characterized in that the air treatment installation comprises a cooling device, in particular a cold battery, wherein the cooling device is provided with a condensation collector.

16. Device as claimed in claim 12, characterized in that the air treatment installation is able and configured to sustain a laminar airflow in the cultivation space with an air velocity of about 15-100 cm/s during operation.

* * * * *